United States Patent
Herbenar et al.

[15] 3,707,094
[45] Dec. 26, 1972

[54] REMOTE SHIFT LEVER MECHANISM

[72] Inventors: Edward J. Herbenar, Detroit; Sam Jenio, Sterling Hts., both of Mich.

[73] Assignee: TRW Inc., Cleveland, Ohio

[22] Filed: Jan. 22, 1971

[21] Appl. No.: 108,849

[52] U.S. Cl. .............................................. 74/473 R
[51] Int. Cl. ............................................. G05g 9/00
[58] Field of Search ....74/473, 473 P, 475, 476, 477; 287/21, 87

[56] References Cited

UNITED STATES PATENTS 2,057,073   10/1936   Vandervoort.....................74/473 R
2,884,261   4/1959   Farr.................................287/21 X
3,410,150   11/1968   Wieland et al. ......................74/476

Primary Examiner—Milton Kaufman
Assistant Examiner—Ronald C. Capossela
Attorney—Hill, Sherman, Meroni, Gross & Simpson

[57] ABSTRACT

A shift lever having a first pivot point defined around a ball-ended stud joint with the stud fixed and the joint forming a portion of the lever, and a second pivot point at one end of the lever having a ball-ended stud joint with the stud affixed to an angled motion-transmitting arm and the joint socket formed in the end of the lever arm. Alternative constructions are illustrated to accommodate the differing radii between the movement of the lever arm around the first joint and the movement of the lever arm and motion-transmitting arm around the second joint.

5 Claims, 5 Drawing Figures

PATENTED DEC 26 1972 3,707,094
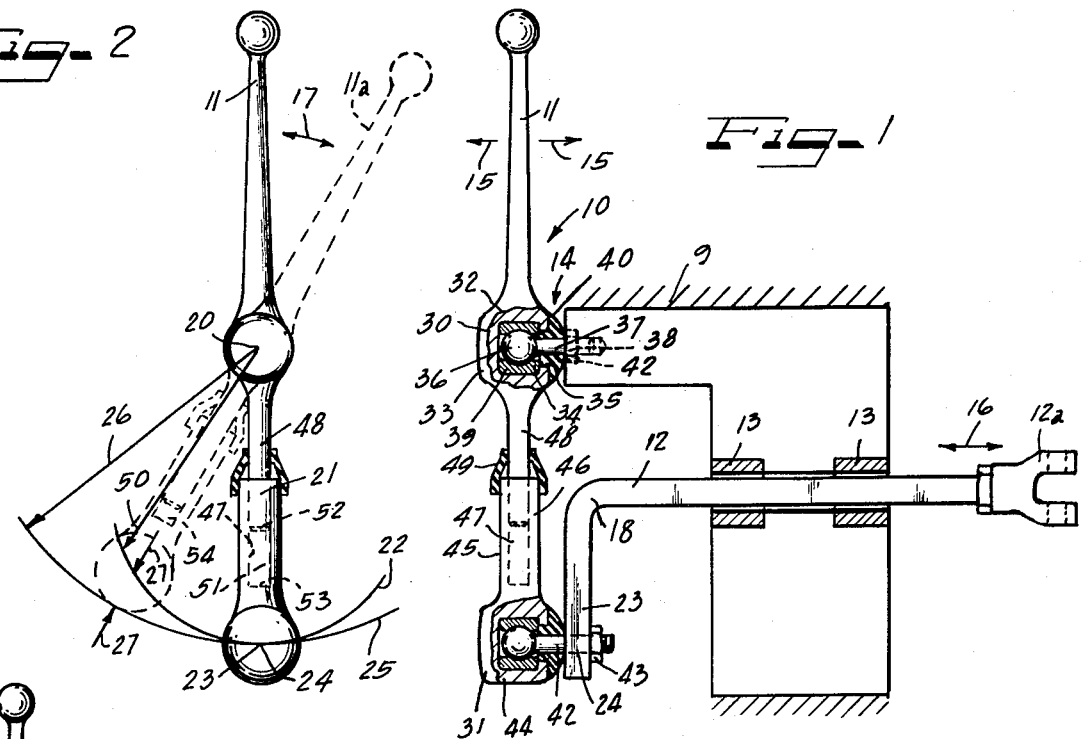
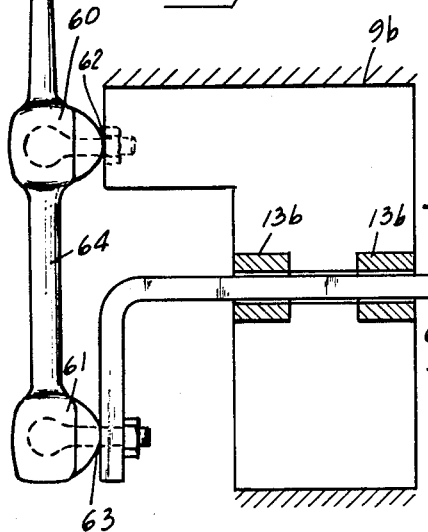
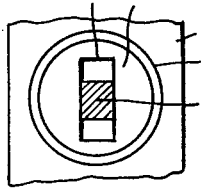
INVENTORS
EDWARD J. HERBENAR
SAM JENIO
BY *Hill, Sherman, Meroni, Gross & Simpson*
ATTORNEYS 3,707,094

REMOTE SHIFT LEVER MECHANISM

BACKGROUND OF THE INVENTION

1. Field of the Invention

This invention relates to shift levers and more particularly to a fixed pivot shift lever cooperating with a non-axial pivot motion transmitting arm.

2. Prior Art

In transmission shifting mechanisms, especially of the manual type, it is necessary to have a shift lever connected with portions of the gear train, which lever is movable both in a longitudinal and lateral direction. This is easily accomplished where the lever is introduced directly to the gear box and the lever can be pivoted thereat. However, where the lever is positioned remote from the gear box, a motion-transmitting arm must be introduced. Oftentimes, the lateral movement of the lever is translated to a rotary movement in the motion-transmitting arm. This requires then that the motion-transmitting arm be pivotable about a point which is different from the pivot point of the lever itself. It is desirable that such arrangements provide adequately sealed joints for the pivot point of the lever and for the connection between the lever and the motion-transmitting arm. Additionally, it is desirable that such a linkage have a minimum amount of free play and a smooth low-friction action. The obtaining of these features in a sufficiently responsive and low-cost mechanism has heretofore not been obtainable. Additionally, there exists a constructional problem inasmuch as the difference in pivot point positioning between the motion transmitting arm and the lever causes a foreshortening of the distance between the lever pivot point and the motion arm attachment to the lever, or alternatively, tends to convert lateral movement of the lever to movement in a plane normal to the lateral movement.

SUMMARY OF THE INVENTION

These difficulties are overcome by the present invention, which provides for sealing at the attachment points through the use of ball joints, thereby allowing a controlled free play and smooth low-friction action. The foreshortening problem is eliminated in one embodiment by a telescoping connection in the lever arm between the pivot point of the lever arm and the attachment point of the motion-transmitting arm to the lever arm. In another embodiment, the problem is avoided by providing an attachment of the motion transmitting arm to the housing or other member in such a manner as to allow movement of the pivot point of the motion transmitting arm. In a third embodiment, the foreshortening problem is eliminated through the use of a hollow ball socket with the lever arm free to float through the ball socket.

It is therefore an object of this invention to provide an improved remote shift lever mechanism using ball-ended stud joint connections.

It is another object of this invention to provide a remote shift lever mechanism using ball-ended stud joints and having non-axial rotation points with means for accommodating linear dimensional changes and necessitated thereby.

It is yet another and more specific object of this invention to provide a remote shift lever wherein the lever is pivotably connected to a fixed housing through a ball-ended stud and the shift bar is movably received in a fixed bushing and attached to the lever through a stud joint with a telescoping connection between a first position of the lever and the shift bar connected portion.

It is yet another specific object of this invention to provide a remote shift lever mechanism wherein the shift lever is connected to a fixed housing through a ball-ended stud joint and has a portion remote from the connection attached to a motion-transmitting bar through a ball stud joint, the bar having a different rotation point from the lever, and the bar floatably received in a rotatable bushing.

It is another specific object of this invention to provide a remote shift lever mechanism wherein the lever is attached to a motion transmitting arm through a ball ended stud joint, the motion transmitting arm having a given pivot point and the lever having a different pivot point provided by a hollow ball joint through which the lever is slidably received.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary cross-sectional view of a remote shift lever mechanism according to this invention having a telescoping section.

FIG. 2 is a plan view partially in section of the lever mechanism of FIG. 1 illustrating movement thereof by dotted lines.

FIG. 3 is a view similar to FIG. 1 illustrating a modified form of this invention.

FIG. 4 is a view of the floating rotatable bushing connection between the motion-transmitting arm and the housing of the embodiment of FIG. 3 taken as indicated by the lines IV—IV.

FIG. 5 is a view similar to FIGS. 1 and 3 illustrating a third modified form of the invention.

DESCRIPTION OF THE PREFERRED EMBODIMENTS

FIG. 1 illustrates a remote shift lever mechansim 10 according to this invention. The mechanism includes a lever 11 pivotably attached to a housing 9. The lever 11 works a motion transmitting arm 12 which has a joint member 12a on one end thereof for moving the transmission members.

The motion transmitting arm 12 is received through bushings 13 fixably positioned in the housing 9. It is to be understood that although only one housing 9 is illustrated, the connection between the lever and the housing and between the motion transmitting arm 12 and the bushings 13 may take place at separate points as in a vehicle with the points connected to the chassis or frame of the vehicle in such a way that their relative positions with respect to one another are predetermined, although not in an immediately common housing.

Because of the freedom of movement of the lever arm 11 around the pivot point connection 14 between the arm and the housing 9, it can be seen that movement of the lever arm longitudinally as indicated by the arrows 15 will cause a longitudinal movement of the motion transmitting arm 12 in the direction of the arrows 16. This movement is an axial movement through the bushings 13. A lateral movement of the lever 11 as illustrated in FIG. 2 in an arcuate manner such as from the solid line position to the dotted line position 11a will cause the motion-transmitting arm 12 to rotate in the bushings. Thus, movement of the lever arm can cause either an axial or a rotational movement of the motion-transmitting arm which movements are sufficient to operate a transmission to shift from one gear train to another. However, in order to obtain the rotative movement of the motion-transmitting arm 12 from a lateral movement as illustrated by the arrows 17 in FIG. 2, it is necessary that the motion-transmitting arm be L-shaped through a bend such as the bend 18 and to be pivotably attached to the housing 9 as through the bushings 13.

In order to obtain this, it is desirable that the pivot axis of the motion-transmitting arm in the bushings 13 be non-axial with the pivot point 14 of the lever. If they were axial it would be difficult to obtain a required smoothness of movement, especially in an axial movement of the motion-transmitting arm. Further, design requirements would prevent axial positioning of the pivot of the motion transmitting arm at the point of pivot of the lever.

This non-axiality of the pivot points causes a foreshortening of the distance between the pivot points as illustrated in FIG. 2. The pivot point of the lever 11 is illustrated at the point 20 in FIG. 2, whereas the pivot point of the motion transmitting arm is illustrated at the point 21. The movement of the end of bent arm 23 around the pivot point 21 is illustrated by the line 22. The bottom point of that path is vertically below the pivots 20 and 21 if they are vertically aligned and is indicated at the point 23. The point 23 is also the point at which the lever is connected to the bent arm 23 via the joint connection 24. The joint connection 24, if fixedly spaced from the pivot 20, will follow the arcuate path 25. This path is drawn so as to have its radius 26 equal to the distance between the pivot point 20 and the point of connection 24. It can be seen that the two arcuate paths 22 and 25 diverge from one another to either side of the point 23. This divergence creates a foreshortening which, when the lever has reached the dotted position 11a, encompasses the distance between the arrows 27,27. While this causes a foreshortening during a rotational movement, the effect is substantially the same in imparting an axial movement to the motion transmitting arm where, however, the result is a lengthening of the distance between the pivot point 20 and the attachment 14 between the lever arm 11 and the motion transmitting arm 12.

According to this invention, in order to provide adequately sealed joints for the pivot point of the lever and for the connection between the lever and motion-transmitting arm, which joints will provide a minimum amount of free play and a smooth low-friction action, ball-ended stud joints 30 and 31 are utilized. The joint 30 provides the pivot point attachment 14 between the housing 9 and the lever arm 11 and may consist of a socket 32 formed in a bulge 33 in the material of the lever arm 11. The socket 32 has a central opening 34 therein communicating to the exterior through a throat portion 35. The socket receives the ball end 36 of a ball-ended stud 37 with the shank portion 38 of the stud projecting through the throat 35. The ball may be entrapped in a self-lubricating bearing block 39, fitted in the socket, and a seal cover 40 may surround the shank portion 37 and close the throat opening. The shank portion 38 may then be secured to the housing as by a nut 42, thereby maintaining the ball-ended stud in a fixed position with respect to the housing 9 while allowing freedom of pivot of the lever 11 around the ball end.

The connection between the lever and the motion transmitting arm 12 is through the ball-ended stud joint 31 wherein the stud 42 has its shank secured to the leg 23 of the motion-transmitting arm 12 as by a nut 43. The joint 31 is substantially the same as the joint 30, except that it is, in the embodiment illustrated in FIGS. 1 and 2, formed as an end portion 44 of a lever linkage member 45 which consists of a hollow shaft portion 46 and the joint 31. The hollow shaft portion 46 has an interior cavity 47 therein which is dimensioned to receive rod-like end portion 48 of the lever 11 which projects beyond the joint 30. It can be seen with the rod portion 48 telescopically received in the opening 47 of the portion 46 that the foreshortening or lengthening effect discussed above can be accommodated by telescoping movement therebetween. A seal 49 may be provided to keep contaminants out of the opening 47.

The effect of the telescoping movement is illustrated in FIG. 2. It can be seen that in the solid line position, the distance between the pivot points 20 and 23 is illustrated by the line 26 which corresponds to the full length radius when the lever is in its vertical position. When the lever has been moved to the position indicated by the dotted lines 11a, the distance between the pivot points is indicated by the line 50 which comprises the length of the short leg 23 of the motion transmitting arm 12. When the lever is in the position indicated by the solid lines, the rod-like portion 48 of the lever member terminates within the opening 47 with a large clearance 51 between the bottom 52 of the rod-like section 48 and the bottom 53 of the open-ing 47. When the lever has been moved to the position 11a, the clearance 54 has been reduced by the distance between the arrows 27,27 to accommodate the foreshortening effect. It can be seen that even in the vertical upright position illustrated by the solid lines, the bottom 52 of the rod-like portion 48 extends a significant distance into the opening 47. This allows for the necessary force transmission between the lever and the section 45. If desired, stops may be provided to prevent the rod-like section 48 from being removed from the opening 47. Further, provision of a significant extension in the vertical position allows for a lengthening effect during axial movement of the motion transmitting arm.

FIGS. 3 and 4 illustrate a modified form of the invention wherein the lever 11c is solid and is fixably positioned through ball-ended sockets 60 and 61 to fixed pivot points 62 and 63 with a solid section 64 between the sockets 60 and 61. Thus, the lever itself is unable to accommodate the foreshortening effect. This is accommodated through a bushing 13b connection between the housing 9b and the motion transmitting arm 12b.

These bushings are illustrated in FIG. 4 and comprise a rotatable sleeve bushing 65 received in a circular opening 66 in the housing 9a. The rotatable sleeve bushing 65 has a rectangular opening 67 centrally disposed therein through which projects the long leg 68 of the motion transmitting arm 12b. It is to be noted that preferably the long leg 68 is square or rectangular and is floatingly received in the larger opening 67. Rotation of the motion transmitting arm 12b will cause rotation of the rotatable sleeve bushing 65 within the opening 66 while the foreshortening effect will cause lateral movement of the squared motion transmitting arm section 68 in the opening 67, thus allowing it to float in the bushing to accommodate foreshortening.

FIG. 5 illustrates a third modified form of this invention, wherein the lever 11b consists of a straight rod 69 with a ball stud joint 70 attached to one end thereof as by a threaded coupling 71. The ball-ended stud 70 provides the attachment to the motion transmitting arm 12d through the shank portion 72 of the stud 73 of the joint 70. Foreshortening is accommodated in this embodiment through the use of a hollow ball socket 74 providing the attachment from the housing 9c to the lever 11d. The hollow ball socket 74 consists of a socket housing 75 with a projecting shank 76 attached to the housing 9c as by a threaded nut 77. The socket 75 is open at both the top 79 and bottom 78 thereof and receives a flattened ball 80 therein. The socket may have a bearing block surrounding the ball 80 and preferably the socket has interior walls 81 dimensioned to receive and retain the ball 80. The ball 80 has an opening 81 diametrically therethrough. The rod section 83 of the lever 11d projects through the opening and is slidable therein in the direction of the arrows 84 whereby the lever accommodates foreshortening or lengthening via vertical movement of the lever through the ball socket 74. Thus, the pivot point for the lever is created by the hollow ball socket 74 which receives the lever in a sliding arrangement allowing it to move therethrough to accommodate foreshortening or lengthening. In this instance, the bushings 13c which receive the motion transmitting arm 12d maintain it in a fixed position with respect to the housing 9c rather than in the floating position of FIGS. 3 and 4.

It can thus be seen from the above that in each of the modified forms of our invention we have provided a remote shift lever mechanism which utilizes a sliding movement between two engaged components of the mechanism to accommodate foreshortening created by the use of differing pivot points between a shift lever and a motion transmitting arm which has a section thereof maintained in a plane transverse the plane of the lever arm. Our invention provides for permanent lubrication and sealing of the connection points between the lever and the housing and the lever and the motion transmitting arm through the use of ball joints. Their use also provides for minimum free play of the shift lever and may include wear takeup bearings in the sockets to provide for longer life of the mechanism. The construction also provides for a smooth, low-friction actuating motion coupled with a shock load dampening effect provided by the use of the bearings. In each of the embodiments, we have provided a shift lever which is pivotably attached to the fixed point on a housing through a ball joint connection, the lever operating a motion transmitting arm having an angled construction with one leg of the arm pivotably attached to the housing at a point different from the at-tachment of the lever to the housing, and with the other leg thereof attached to the lever at a point remote from the pivotable attachment of the lever to the housing. In each instance, foreshortening caused by the different pivot points is accommodated through a sliding motion between two parts of the mechanism. In the first embodiment, this is accommodated through a telescoping sliding movement between two component parts of the lever spaced between the two attachment points. In the second embodiment, this is accommodated through a floating bushing connection between the one leg of the motion-transmitting arm and the housing bushings receiving it. In the third embodiment, this is accommodated through a sliding movement of a portion of the lever arm received in a hollow ball socket comprising the pivot point attachment between the lever and the housing.

Although the principles of our invention have herein been discussed with reference to specific theories and embodiments, it is to be understood that these are by way of illustration only and that others may wish to utilize our invention in different designs or applications.

We claim as our invention:

1. A remote shift lever mechanism comprising: a housing to which the mechanism is attached and through which a portion of the mechanism extends; an actuatable lever member; an actuated motion transmitting arm attached to one end of the lever; said lever pivotably attached to a fixed point on said housing by a ball joint; said arm having an angled construction with a first leg projecting at an angle from a second leg; said first leg rotatably and axially movably attached to the housing on an axis radially spaced from said fixed point; the said second leg pivotably attached to the said one end by a ball joint whereby movement of the lever around its pivotable attachment to the housing imparts rotary or axial movement to said first leg; and slidable connecting means between two attached-together portions of said mechanism accommodating forces tending to change the distance between the said fixed pivot point and the one end, said connecting means spaced from the attachment of said second leg to the one end.

2. A remote shift lever mechanism comprising: a housing member; a lever member having a ball joint socket intermediate the ends thereof; the lever member connected to the housing in pivotable relationship by a ball ended stud received in said socket; a motion-transmitting arm having one leg thereof projecting at an angle to another leg thereof; said one leg thereof pivotably received through said housing; the other leg thereof extending in a plane parallel to the longitudinal plane of the lever member; a connecting member; one end of said connecting member attached to the free end of the said other leg through a ball joint; a stem portion projecting from the said one end; said stem and a portion of the said lever member spaced from the said socket telescopically connected together with a portion of one of said stem and said portion of said lever member projecting into an axial opening in one of said stem and said portion of said lever member.

3. A remote shift lever mechanism comprising: a lever arm; a housing member; said lever arm connected to said housing member intermediate the ends of the said lever arm through a pivotable connection; a motion transmitting arm; said motion transmitting arm having a first leg projecting at an angle from the second leg; said second leg lying in a plane parallel to the longitudinal plane of the lever arm; one end of said lever arm connected through a pivotable connection to the second leg; the said first leg projecting through a portion of the said housing in a plane normal to the longitudinal plane of the said lever arm; the said first leg projecting through bushings received in the said housing; the said bushings rotatable in the said housing; the said first leg axially movable in the said bushings; said first leg received through an opening in said bushings; said opening restraining non-axial movement of said first leg except along one diameter of the said bushing; and said first leg free to move along said diameter in sliding relation with the sides of said opening.

4. A remote shift lever mechanism comprising: a housing member; a lever member; a motion-transmitting arm; said motion-transmitting arm having a first leg thereof projecting at an angle from the second leg thereof; said second leg thereof projecting through bushings in the said housing; said bushing restraining the said first leg thereof against radial movement while allowing and rotational movement thereof; said second leg attached to one end of the said lever member through a pivotable attachment; a hollow ball socket attached to said housing at a point spaced from the said bushings; a ball received in said hollow ball socket; said ball having a diametrical opening therethrough; said lever member projecting through said diametrical opening; and said lever member free to move axially with respect to said ball socket; said ball socket providing a pivotable connection between said lever member and said housing.

5. The mechanism of claim 4 wherein the said pivotable connection between the said one end of the said lever member and the said second leg of the said motion-transmitting arm comprises a ball-ended stud joint.

* * * * *